United States Patent [19]
Plotkin

[11] Patent Number: 5,655,872
[45] Date of Patent: Aug. 12, 1997

[54] GRAIN CART WITH FRONT UNLOAD AUGER

[76] Inventor: David S. Plotkin, 461 E. High Point Dr., Peoria, Ill. 61614

[21] Appl. No.: 575,861

[22] Filed: Dec. 20, 1995

[51] Int. Cl.$^6$ ........................................ B60P 1/40
[52] U.S. Cl. .................. 414/526; 414/523; 414/519; 198/313; 198/674
[58] Field of Search .................. 414/507, 502, 414/503, 504, 505, 523, 526, 520, 287, 288, 325, 326, 519; 198/860.4, 860.3, 860.1, 657, 861.1, 861.5, 671, 313, 674

[56] References Cited

U.S. PATENT DOCUMENTS

| | | | |
|---|---|---|---|
| 2,743,571 | 5/1956 | Turnbull et al. | 414/526 X |
| 4,095,705 | 6/1978 | Hood | 414/519 |
| 4,411,581 | 10/1983 | Niewold | 414/523 X |
| 4,415,303 | 11/1983 | Westendorf et al. | 414/523 X |
| 4,846,621 | 7/1989 | Warsaw . | |
| 5,013,208 | 5/1991 | Grieshop . | |
| 5,100,281 | 3/1992 | Grieshop . | |
| 5,516,253 | 5/1996 | Linscheid et al. | 414/526 X |

OTHER PUBLICATIONS

Brochure entitled "Grain Carts", Published by J&M Manufacturing Co., dated Mar., 1994.
Brochure entitled "Model 528, Model 750, Model 895 Grain Carts", published by BII Bradford Industries, Inc., Jun. 1988.

Primary Examiner—Frank E. Werner
Attorney, Agent, or Firm—Emrich & Dithmar

[57] ABSTRACT

This invention relates to a grain cart having a downwardly and inwardly tapered hopper for temporarily storing grain, an auger mounted to an outer, forward portion of the cart's hopper is adapted for unloading grain from the cart. An interface housing mounted to the outer portion of the cart's forward inclined wall and disposed over an aperture in the wall is coupled to a lower end of the auger. Grain discharged from the hopper under the influence of gravity enters the interface housing and is removed from the housing by the auger for discharge into another vehicle such as a truck. The interface housing is removably mounted to the outer surface of the hopper, such as by bolts, to facilitate removal and repair of the auger, and to simplify grain cart design and manufacture. An angle drive gearbox couples the auger shaft to the power take-off unit of a tractor pulling the grain cart for driving the auger. By mounting the auger to an outer, front portion of the grain cart, the position and operation of the auger is easily viewed by the tractor operator without leaving his position while "on-the-go." The auger is moveable between an extended position for discharging grain to the side and front of the cart and a retracted position wherein the auger is folded adjacent the front wall of the cart's hopper. The auger interface housing includes a lever-actuated lower discharge door which allows the auger and hopper to be emptied of grain from the bottom by gravity.

9 Claims, 4 Drawing Sheets

GRAIN CART WITH FRONT UNLOAD AUGER

FIELD OF THE INVENTION

This invention relates generally to apparatus for temporarily storing and transporting grain and is particularly directed to a grain cart having an unload auger disposed outside of the cart's hopper and mounted to a forward, outer portion of the hopper.

BACKGROUND OF THE INVENTION

A grain cart is typically used in combination with a combine in the harvesting of grain for temporarily storing the harvested grain. The grain cart is typically drawn by a tractor alongside the combine which off loads its contents into the grain cart. The grain in the cart is then offloaded into another vehicle such as a truck for transport to a grain elevator. Offloading of the grain cart is sometimes accomplished in the field "on-the-go" while the grain cart is receiving grain from the combine during the harvesting operation. The use of the grain cart with the operating combine in an "on-the-go" manner eliminates combine downloading time and thus represents more efficient use of the combine.

A grain cart includes a hopper open at the top for receiving grain and tapered toward the bottom so that the grain collects in a portion of the grain cart having a reduced volume at the bottom of the cart. This facilitates discharge of the grain from the hopper by means of an auger, or grain drill. The auger typically extends through the hopper body and includes a lower auger portion disposed within the hopper and an upper auger portion extending out from an upper portion of the hopper. The upper portion of the auger typically pivots between a folded position for transport and storage of the cart and an extended position for offloading the grain from the cart. The auger may extend through either a forward or a side wall of the hopper as the grain is discharged from the auger to one side of the cart. Incorporating the auger within the hopper increases auger installation complexity and cost as the auger must extend through the hopper in a sealed manner to prevent leakage of the grain from the cart while still permitting high speed offloading of the grain via the auger. In addition, the auger is one of the few moving parts on the cart and is thus more susceptible to wear and breakage than perhaps any other grain cart component. Locating at least the lower end portion of the auger within the cart's hopper increases the difficulty in repairing or replacing the auger.

The auger is frequently positioned on the side of the grain cart to facilitate offloading of the grain into another vehicle such as a truck positioned adjacent to the cart. Positioning the auger on the side of the grain cart frequently makes it difficult for an operator of a tractor pulling the cart to monitor the operation of the auger including determining when the auger is in the fully folded or fully extended position for offloading of grain. Attempting to offload grain when the auger is not in the fully extended position may result in loss of grain and/or damage to the auger. Some grain carts have addressed this problem by locating the auger in front of the cart's hopper within view of the tractor operator. This type of installation either has the auger extending through the hopper or located outside of the hopper, with the latter approach requiring a second auger within the hopper for discharging grain from the hopper into the unloading auger. The use of two augers increases the complexity and cost of the grain cart.

The tapered lower portion of the hopper is typically sealed and continuous to prevent leakage of grain from the hopper. In those cases where the auger is located outside of the hopper and grain passes through an aperture in the hopper into the auger, the lower end of the auger is mounted to an outer surface of the hopper in a sealed manner to prevent grain leakage. This arrangement makes it difficult to clean the hopper after use. In addition, where an uncovered grain cart is stored outside, water tends to collect and remain in the bottom of the hopper rendering the hopper, as well as the lower end of the auger, more susceptible to water damage such as from rust and corrosion. Finally, in those auger installations where the auger extends through the hopper, the fixed lower auger section and the folding upper auger section must be "matched" as a set, where both sections are typically made from a single large tube which is cut into sections. The auger sections must be matched because of complications involved with welding the fixed lower auger section in position within the hopper. This requirement to match the two auger sections limits manufacturing flexibility and further complicates the manufacturing process.

The present invention addresses the aforementioned limitations of the prior art by providing a grain cart with a front unload auger located entirely outside of the cart's hopper, with a lower end of the folding auger mounted to an outer portion of the hopper over a grain discharge aperture therein and further including a discharged door which allows for drainage of water from the hopper, as well as gravity discharge of grain from the hopper.

OBJECTS AND SUMMARY OF THE INVENTION

Accordingly, it is the object of the present invention to provide a front unload auger arrangement for a grain cart which facilitates auger installation, repair and replacement, and simplifies grain cart design and manufacture.

It is another object of the present invention to provide a front unload auger for a grain cart which is easily viewed by a tractor operator without leaving his position while "on-the-go" and which, when retracted to the non-use configuration, does not extend beyond the lateral or vertical dimensions of the cart's storage tank or hopper.

A further object of the present invention is to provide an auger installation mounted to the outside of a grain cart hopper, which allows grain to be discharged from the bottom of the cart under the influence of gravity, facilitates access to the lower end of the auger for repair or replacement, and allows for cleaning of the auger and hopper by permitting discharge of water from the bottom of the cart.

This invention contemplates a cart for storing and transporting grain, the cart comprising: a generally funnel-shaped hopper open at the top for receiving and storing grain, the hopper including a plurality of downwardly extending, inwardly directed lateral walls providing the hopper with a tapered bottom center portion having an aperture therein, wherein the hopper is supported on a frame having a plurality of wheels attached thereto; a housing disposed over the aperture in the tapered bottom center portion of the hopper and attached to a forward wall of the hopper, the housing adapted to receive grain discharged from the aperture; a first auger section attached to the forward wall of the hopper and having lower and upper end portions, wherein the lower end portion of the first auger section is coupled to the housing for receiving grain from the housing and displacing the grain in an upward direction; and a second auger section pivotally coupled to the upper end portion of the first auger section and movable between a first folded position, wherein the second auger section is disposed adjacent the forward wall of the hopper, and a second extended position, wherein the second auger section is adapted to receive grain from the first auger section for discharge from the hopper.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
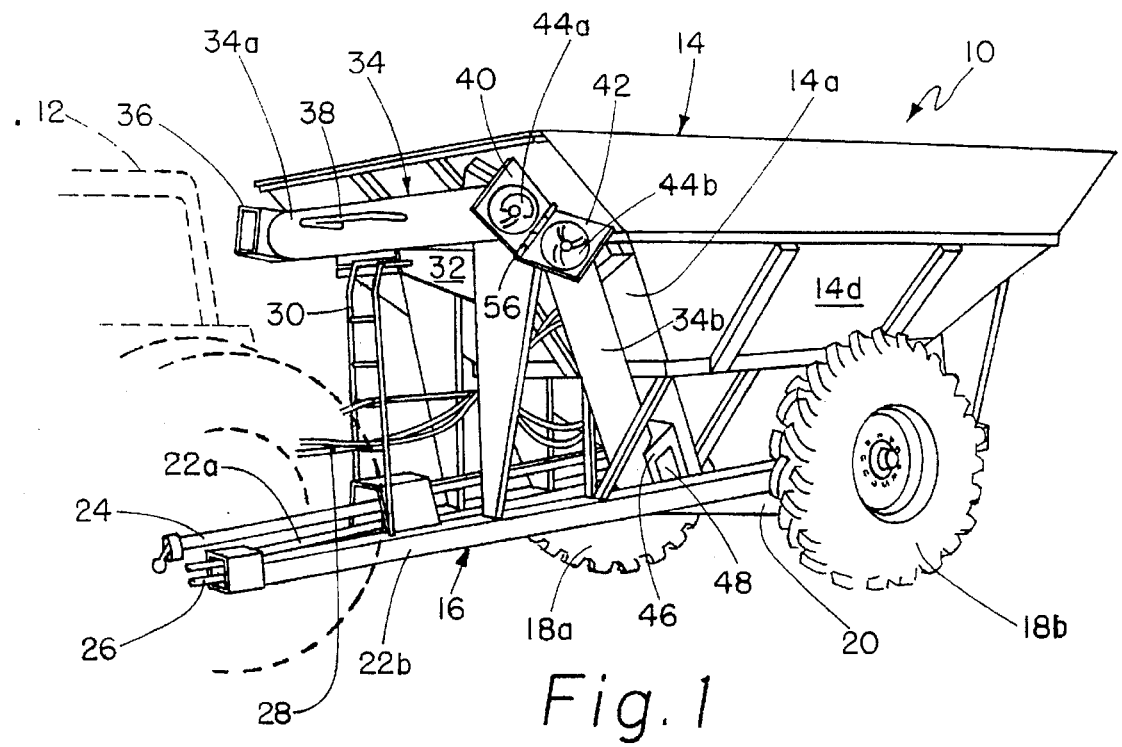
FIG. 1 is a perspective view of a grain cart with a front unload auger in accordance with the present invention, showing the auger in a folded, or retracted position.
Figure 2:
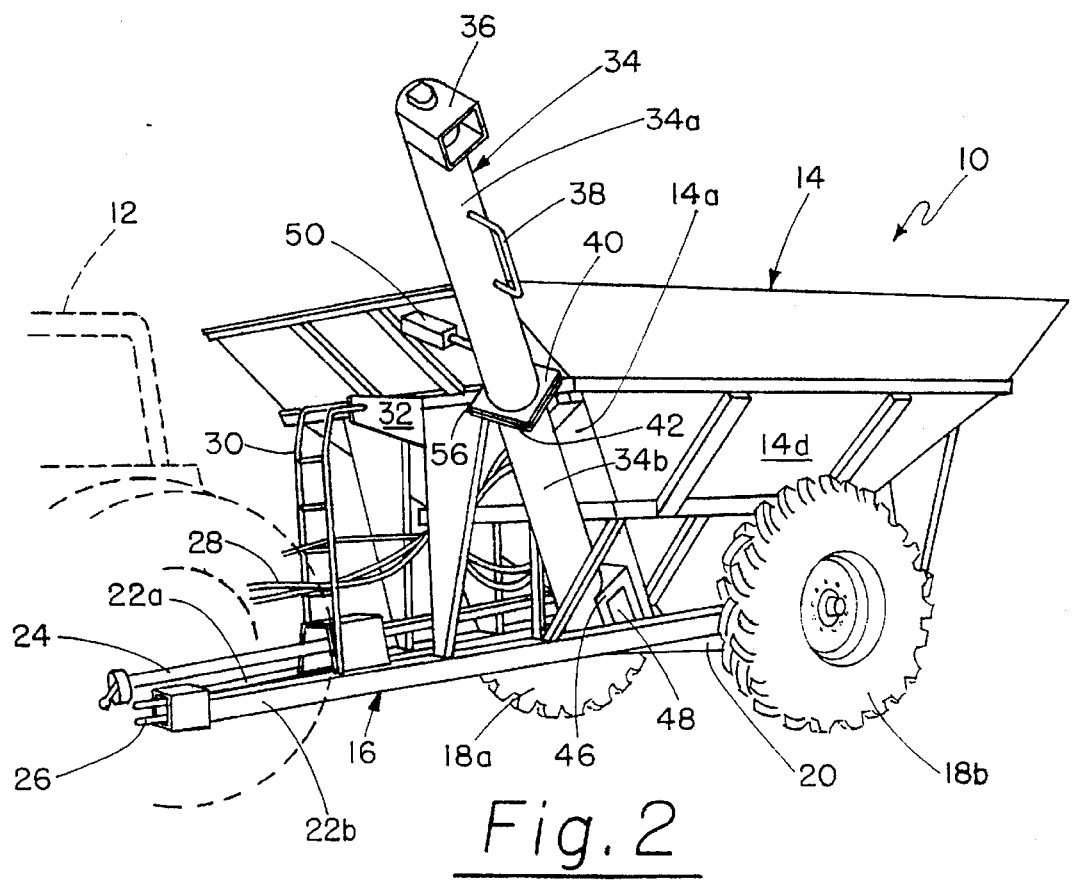
FIG. 2 is a perspective view of a grain cart with a front unload auger in accordance with the present invention, showing the auger in the extended, or unfolded position.
Figure 3:
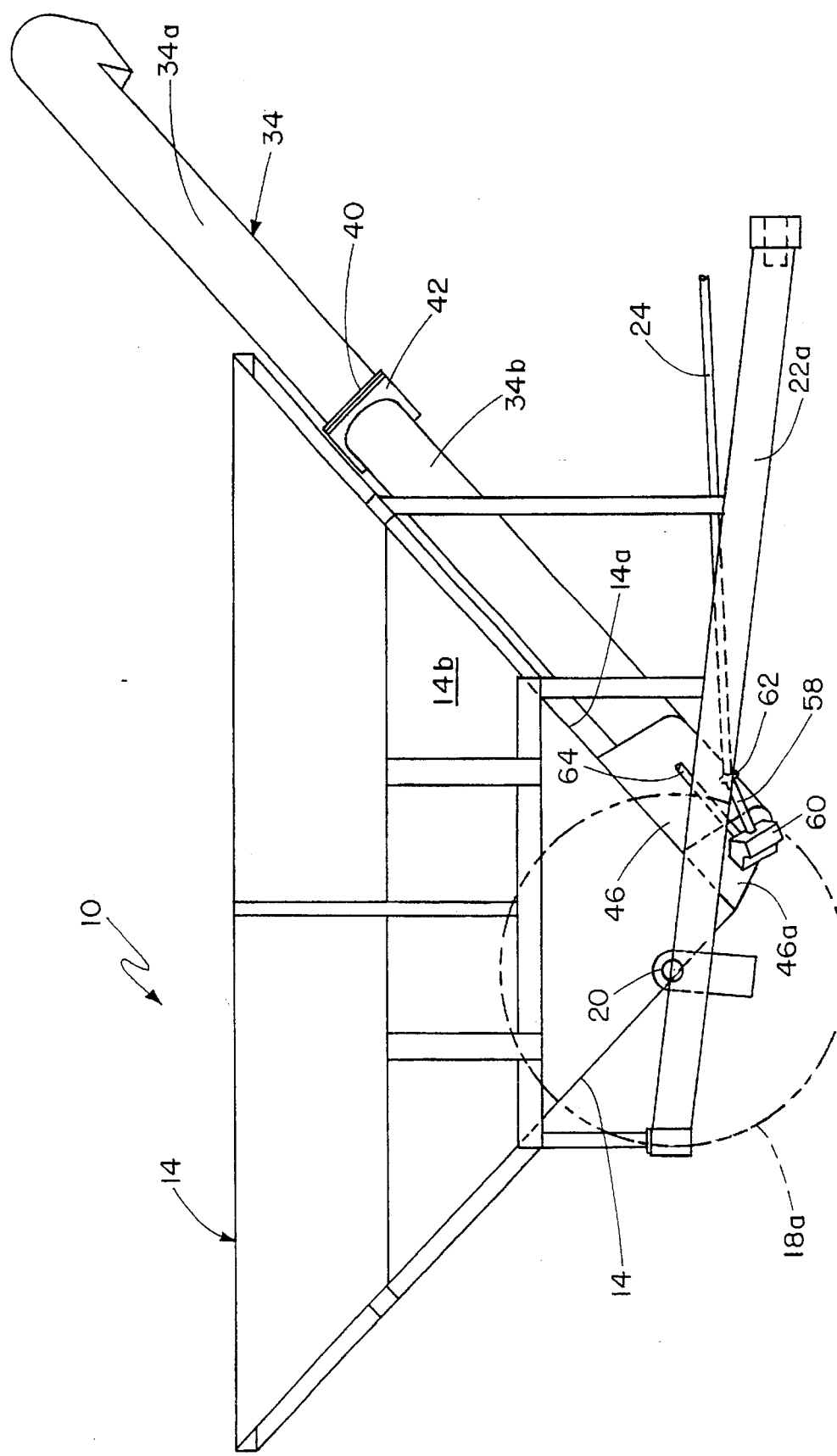
FIG. 3 is a side elevation view shown partially in phantom of the grain cart of the present invention illustrating the auger in the extended position for offloading of grain.
Figure 4:
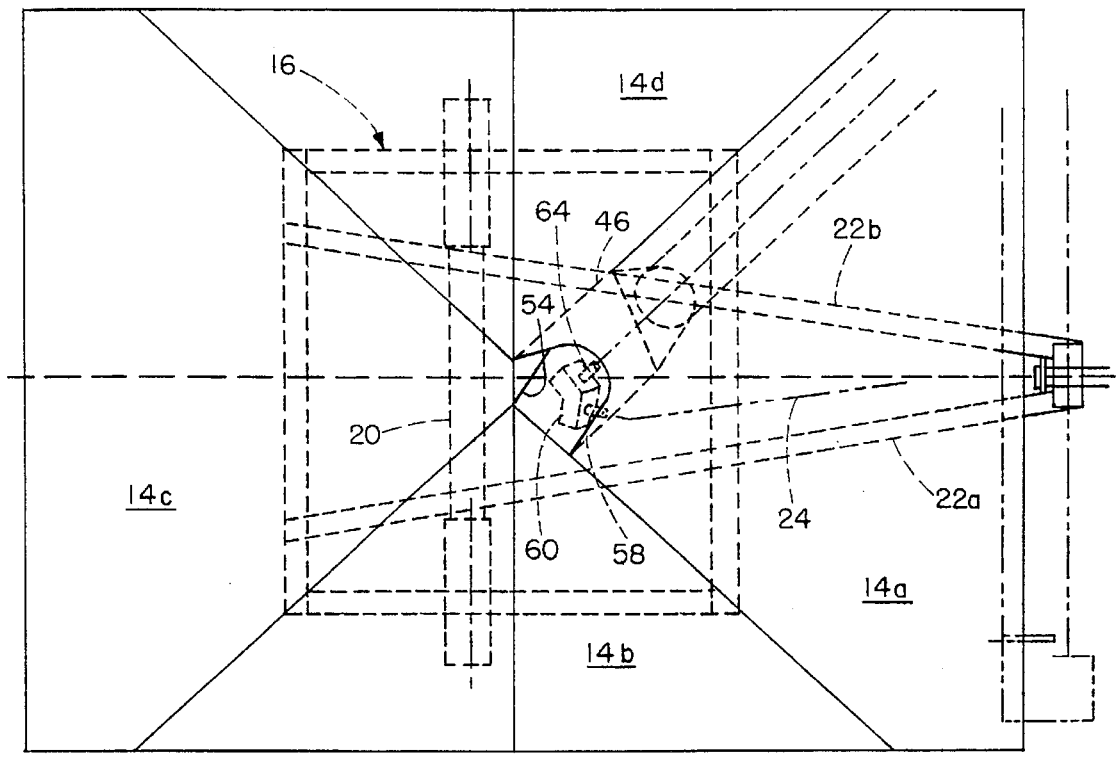
FIG. 4 is a top plan view of the grain cart illustrating details of the auger drive arrangement.

Referring to FIG. 1, there is shown a perspective view of a grain cart 10 in accordance with the present invention. In FIG. 1, the grain cart's auger 34 is shown in the retracted, or folded, position for transport or storage of the cart. FIG. 2 is a perspective view of the grain cart 10 of the present invention, showing the auger 34 in the extended, or unfolded, position for offloading of grain from the cart. Referring also to FIGS. 3 and 4 which are respectively side elevation and top plan views of the grain cart 10, additional details of the grain cart will now be described.

The grain cart 10 includes a generally rectangular hopper 14 including a front panel 14a, right and left panels 14b and 14d, and an aft panel 14c. The terms "right" and "left" are used when viewing the grain cart 10 in the direction of its travel toward a tractor 12 (shown in dotted line form in FIG. 1) used for pulling the grain cart. Hopper 14 is positioned upon and supported by a lower frame 16 comprised of various support members, including right and left frame members 22a and 22b. Hopper 14 is attached to the lower support frame 16 by various support members which are shown in the various figures, but are not discussed herein as they are conventional in design and structure. Forward end portions of the right and left frame members 22a, 22b are attached to a three-point hitch 26 for attachment to tractor 12. Coupled to the right and left frame members 22a and 22b is an axle 20 to respective ends of which are attached right and left wheels 18a and 18b.

Figure 5:
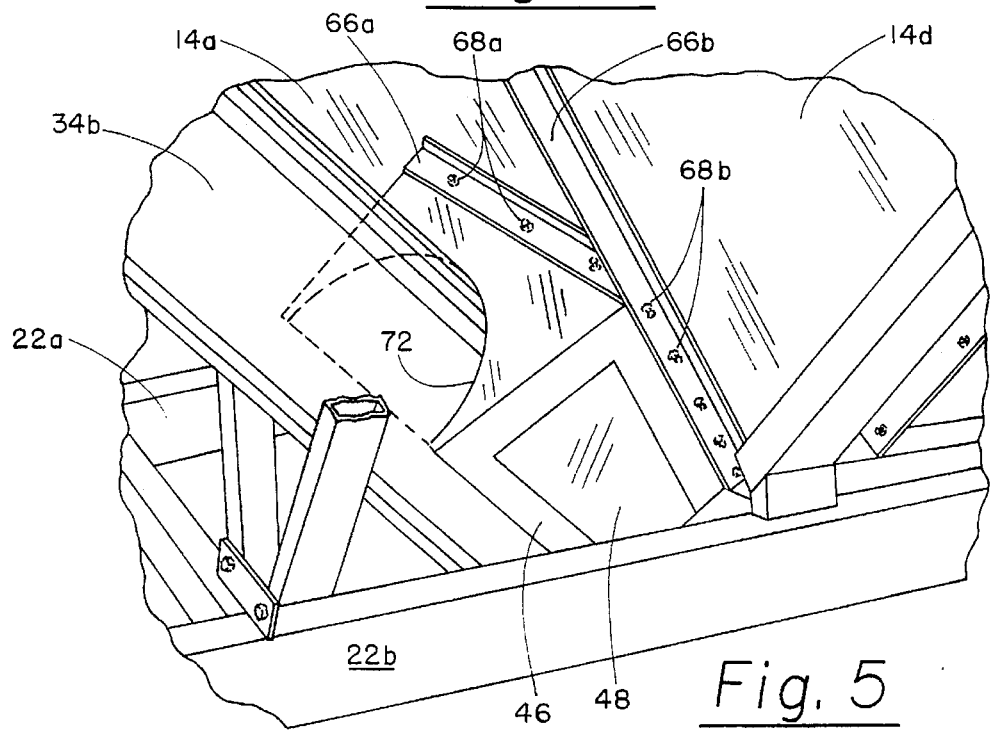
FIG. 5 is a partial perspective view showing details of the mounting of the lower end of the auger to the bottom of the grain cart's hopper in accordance with the present invention.

The right and left panels 14b, 14d of the hopper 14 are tapered inwardly toward one another in proceeding from an upper portion to a lower portion of the hopper. Similarly, the hopper's front panel 14a and aft panel 14c are tapered inwardly toward one another in proceeding downwardly along the hopper 14. The side-to-side and forward-to-aft tapered configuration of the hopper 14 provides it with an inverted pyramidal shape allowing the grain to freely flow downwardly under the influence of gravity toward the bottom of the hopper. Located in a lower portion of the hopper's front panel 14a is an aperture 54 as shown in FIG. 4. Attached to an outer portion of the hopper's front panel 14a and disposed over the aperture 54 therein is an auger interconnect housing 46. An enlarged perspective view of the auger interconnect housing 46 attached to the hopper's forward panel 14a is shown in FIG. 5.

Interconnect housing 46 is attached to the hopper's front panel 14a by means of a combination of mounting brackets 66a and 66b and nut and bolt combinations 68a and 68b. A lower portion of interconnect housing 46 is securely attached to a lower end of an intake auger housing 34b by conventional means such as weldments 72. The portion of the intake auger housing 34b attached to the interconnect housing 46 includes an aperture to permit grain which exits hopper 14 via aperture 54 to flow into the lower end of the intake auger housing 34b. Rotation of the auger drill causes grain deposited in the lower end of the intake auger housing 34b to be displaced upwardly into a discharge auger housing 34a and out of the auger via a discharge nozzle 36 disposed on the distal end of the discharge auger housing. Disposed within the auger inter connect housing 46 is a discharge door 48. Discharge door 48 is movable between a closed position for retaining grain within the interconnect housing 46 and the intake auger housing 34b and an open position which permits grain to flow under the influence of gravity from the hopper 14. Auger discharge door 48 is movable between the open and closed positions by means of an operator actuated lever which is not shown in FIG. 5 for simplicity, but which is described in detail below. With the auger discharge door 48 in the open position, not only is grain free to flow under the influence of gravity from the hopper, but water which may collect within the hopper when the grain cart is washed or stored outside is also allowed to freely flow from the hopper. With the auger discharge door 48 open, water is prevented from collecting within the auger and hopper combination reducing the possibility of corrosion and failure of these components. An upper end portion of the intake auger housing 34b is attached to a forward portion of the hopper 14 by a conventional mounting bracket which is not shown for simplicity.

Referring back to FIGS. 1 and 2, the discharge auger housing 34a is pivotally coupled to the intake auger housing 34b by conventional means such as a hinge arrangement 56. The discharge auger housing 34a is movable between a folded, retracted position shown in FIG. 1 and an extended, unfolded position shown in FIG. 2 by means of a hydraulic cylinder 50 mounted to a forward portion of the cart's hopper 14. Hydraulic hoses 28 coupled to the tractor's hydraulic system provide hydraulic fluid under pressure to the double-acting auger hydraulic cylinder 50 for folding and unfolding the auger 34. A support bracket 32 also attached to a forward portion of the hopper 14 provides support for the discharge auger housing 34a when in the folded position as shown in FIG. 1. Attached to the cart's frame 16 as well as to the auger support bracket 32 is a ladder 30. Ladder 30 permits a worker to climb up to the top of the grain cart 10 and look into the hopper 14 in the event problems are encountered in offloading grain. A handle 38 attached to the discharge auger housing 34a is located above ladder 38 when the discharge auger housing is in the folded position, as shown in FIG. 1, to assist a worker in climbing up the ladder to look into the cart's hopper 14.

Figure 6:
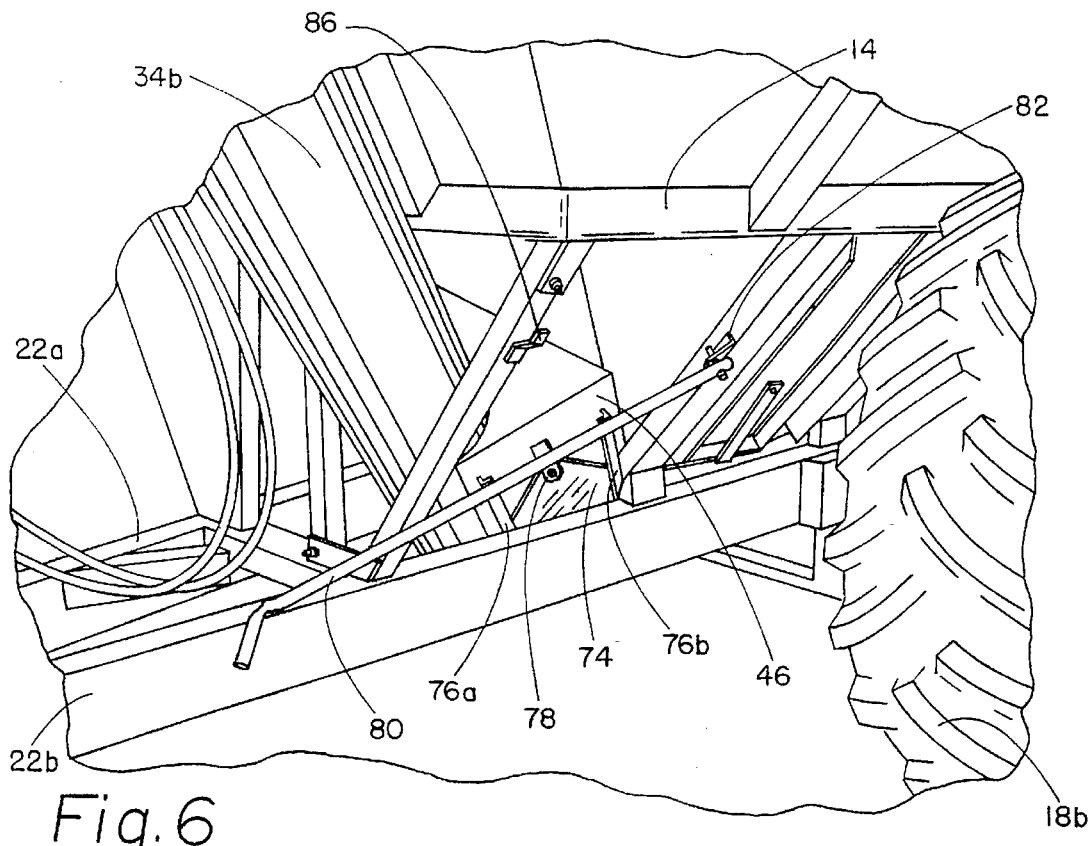
FIGS. 6 and 7 are partial perspective views of a lower portion of the grain cart hopper and auger combination showing an auger discharge door respectively in the closed and open positions.
Figure 7:
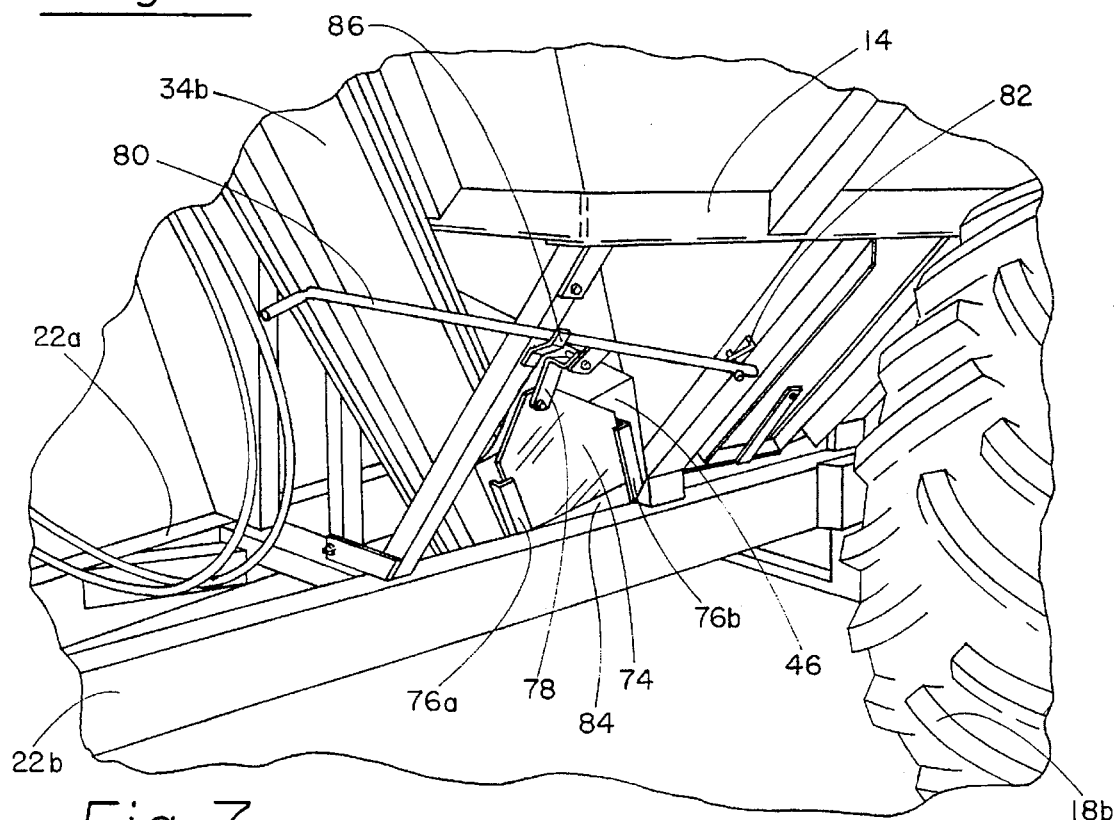

Referring to FIGS. 6 and 7, there are shown partial perspective views of the lower portion of the grain cart's hopper and auger combination respectively showing an auger discharge door 74 in the closed and opened positions. Auger discharge door 74 is mounted to an outer surface of the interconnect housing 46 by means of a pair of spaced, parallel door guides 76a and 76b. Door guides 76a, 76b permit the auger discharge door 74 to move in a sliding manner on the interconnect housing 46 between a lowered position as shown in FIG. 6 and a raised position, as shown in FIG. 7. With the discharge door 74 in the raised position, an opening 84 is formed in a lateral, lower portion of the interconnect housing 46 to allow for the discharge of grain under the influence of gravity from the hopper and auger combination. The auger discharge door 74 is coupled to a discharge door handle 80 by means of a coupling bracket 78. One end of the door handle 80 is coupled to a structural member supporting the cart's hopper by means of a pivot bracket 82. Door handle 80 is movable between a lowered position as shown in FIG. 6 for closing the auger discharge door 74, and a raised position as shown in FIG. 7 for opening the discharge door. A support bracket 86 attached to a lower frame structural member engages the discharge door handle 80 for maintaining the handle in the raised position, and the auger discharge door 74 in the open position as shown in FIG. 7.

There has thus been shown a grain cart with a front unload auger mounted to a forward portion of a downwardly and inwardly tapered hopper. The auger is disposed outside of the hopper and is attached to the hopper by means of an interconnect housing disposed over a grain discharge aperture in a lower, forward portion of the hopper. The interconnect housing is mounted to a forward wall of the hopper by conventional means such as mounting bolts and is easily removed to facilitate installation, repair or replacement of the auger. The interconnect housing further includes a hand actuated discharge door to permit the hopper to be emptied of grain by gravity. The discharge door also allows water to drain from the hopper such as following cleaning of the hopper or when the cart is stored outside to reduce the possibility of corrosion and rusting of the auger and hopper. The auger includes a lower intake auger housing and an upper discharge auger housing pivotally coupled to permit the discharge auger housing to be moved between a folded position for transport and storage of the cart and an unfolded, extended position for unloading grain. When folded, the auger does not extend beyond the lateral or vertical dimensions of the hopper to provide a compact configuration to facilitate transport and storage of the cart. By positioning the auger in front of the hopper, the auger is easily visible to an operator of a tractor pulling the cart for verification of the position of the auger as well as of its operating condition. By attaching the lower end of the auger to the bottom of the hopper which is tapered inwardly from side-to-side as well as from back-to-front in the form of an inverted pyramid, the auger can completely empty the cart's hopper without the requirement of another auger within the hopper for displacing grain toward the exterior mounted unload auger. In addition, by mounting the entire auger to an outer portion of the cart's hopper in an easily removable arrangement the lower intake and upper discharge sections of the auger do not have to be "matched" which allows for increased manufacturing flexibility.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A cart for storing and transporting grain, said cart comprising:

a generally funnel-shaped hopper open at the top for receiving and storing grain, said hopper including a plurality of downwardly extending, inwardly directed lateral walls providing said hopper with a tapered bottom center portion having an aperture therein, wherein said hopper is supported on a frame having a plurality of wheels attached thereto;

a housing disposed over the aperture in the tapered bottom center portion of said hopper and attached to an outer portion of a forward wall of said hopper, said housing adapted to receive grain discharged from said aperture;

a first auger section disposed in closely spaced relation to the outer portion of the forward wall of said hopper and having lower and upper end portions, wherein the lower end portion of said first auger section is coupled to and supported by said housing for receiving grain from said housing and displacing the grain in an upward direction;

a second auger section pivotally coupled to the upper end portion of said first auger section and movable between a first folded position, wherein said second auger section is disposed adjacent the forward wall of said hopper, and a second extended position, wherein said second auger section is adapted to receive grain from said first auger section for discharge from said hopper;

coupling means for attaching said housing to an outer, lower portion of the forward wall of said hopper in a removable manner to facilitate installation, repair or replacement of said auger sections; and an angle drive gearbox coupling said first auger section to a power take-off shaft extending forward of said hopper.

2. The cart of claim 1 wherein said hopper is generally rectangular, having forward and aft walls, and right and left side walls, and wherein said walls are inwardly tapered in proceeding downwardly in providing said hopper with a generally pointed bottom portion.

3. The cart of claim 1 wherein said coupling means includes a plurality of nut and bolt combinations.

4. The cart of claim 1 further comprising a door in said housing for allowing discharge of grain from said housing and emptying of said hopper.

5. The cart of claim 1 further comprising displacement means coupled to said second auger section for moving said auger section between said first folded position and said second extended position.

6. The cart of claim 5 wherein said displacement means is further coupled to said hopper and includes a hydraulic cylinder.

7. The cart of claim 1 wherein said angle drive gearbox includes an input shaft coupled to said power take-off shaft and an output shaft extending through said housing and coupled to said first auger section.

8. The cart of claim 1 further comprising a ladder disposed on a forward portion of said grain cart and a handle attached to said second auger section, wherein said handle is disposed adjacent an upper end portion of said ladder when said second auger section is in said first folded position, and wherein said handle is disposed out of reach of a person on said ladder when said second auger section is in said second extended position.

9. A grain cart comprising:

a support frame including a plurality of wheels;

a hopper disposed on said support frame and including an open upper portion for receiving grain and a plurality of downwardly extending, inwardly directed lateral walls forming a tapered bottom center portion of said hopper, said hopper further including a front lateral wall having an aperture in a lower portion thereof;

an auger mounted to an outer portion of the front lateral wall of said hopper and including a lower intake housing and an upper discharge housing each having respective upper and lower end portions, wherein an upper end portion of said lower intake housing is pivotally coupled to a lower end portion of said upper discharge housing;

displacement means coupled to said upper discharge housing for moving said upper discharge housing between a folded position adjacent the outer portion of the front lateral wall of said hopper for transport storage of the grain cart and an extended position for unloading grain from the cart;

an interconnect housing mounted to an outer portion of the hopper's front lateral wall and disposed over the aperture therein for attaching a lower end of said lower intake housing to said hopper for allowing grain to enter said auger from said hopper under the influence of gravity, said interconnect housing including a discharge aperture therein;

a manually operated door attached to said interconnect housing over the discharge aperture therein and movable between a closed position and an open position, wherein grain is confined in said interconnect housing for discharge by said auger when said door is in said closed position and wherein grain is discharged from said hopper and interconnect housing under the influence of gravity when said door is in said open position; and coupling means for attaching said interconnect housing to the outer portion of the hopper's front lateral wall in a removable manner to facilitate installation, repair or replacement of said auger.

* * * * *